United States Patent

[11] 3,576,145

[72] Inventor Lewis Bernath
 Chelsea, Mich.
[21] Appl. No. 811,906
[22] Filed Apr. 1, 1969
[45] Patented Apr. 27, 1971
[73] Assignee Federal Screw Works
 Detroit, Mich.

[54] TOOL HOLDER
 8 Claims, 8 Drawing Figs.
[52] U.S. Cl. .................................................. 82/35
[51] Int. Cl. .......................................... B23b 29/16
[50] Field of Search ......................................... 82/35

[56] References Cited
UNITED STATES PATENTS
1,751,078 3/1930 Drowns ....................... 82/35

Primary Examiner—Francis S. Husar
Attorney—Harness, Dickey and Pierce

ABSTRACT: A shaving tool holder for use on automatic screw machines or the like. The tool holder is self-adjusting and carries a roller for engaging the work at a location opposite the tool. The roller and tool are supported on a head positioned at one end of a pivoted arm. The arm is spring biased to permit the tool and roller to align with the work.

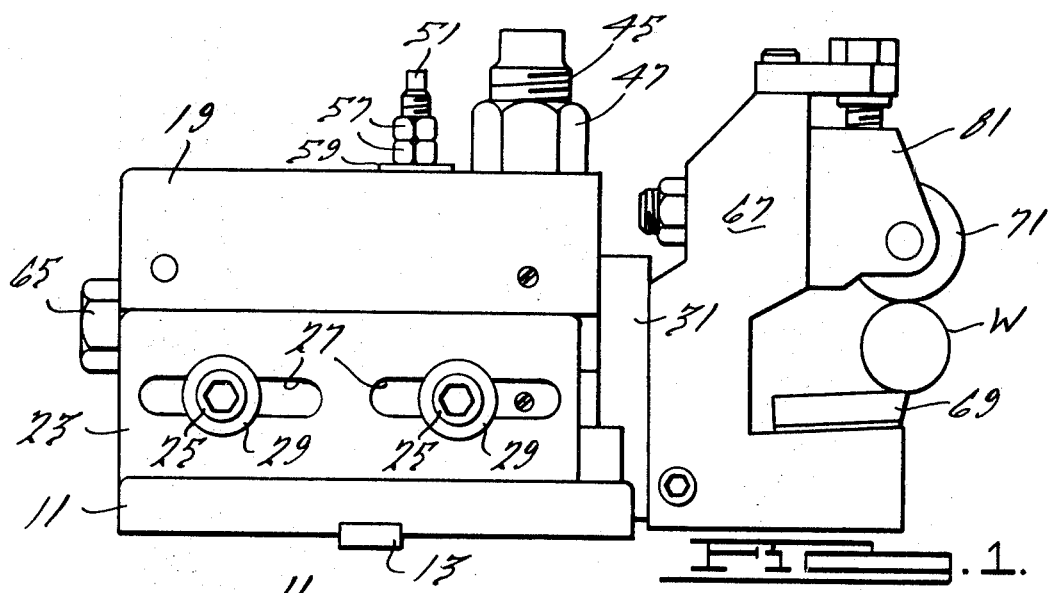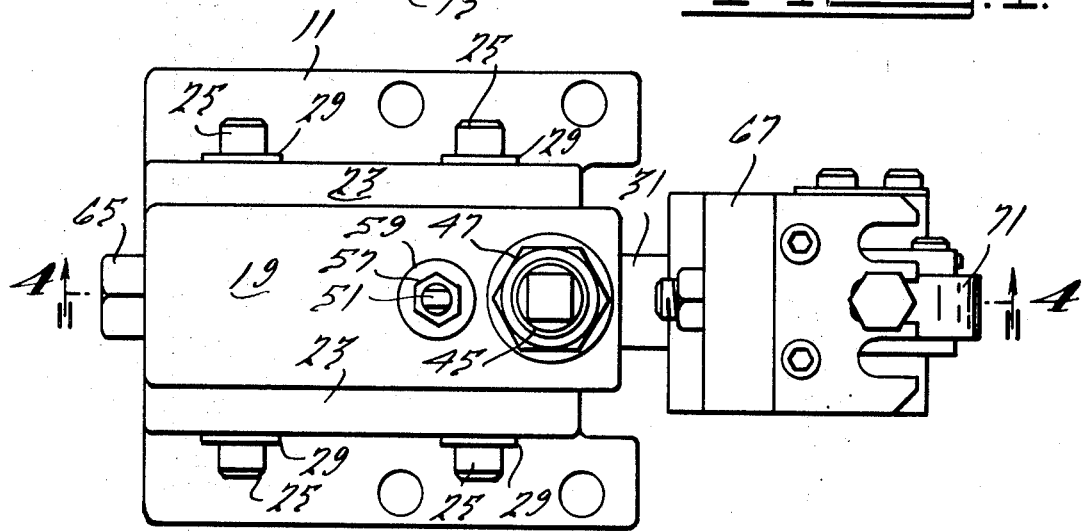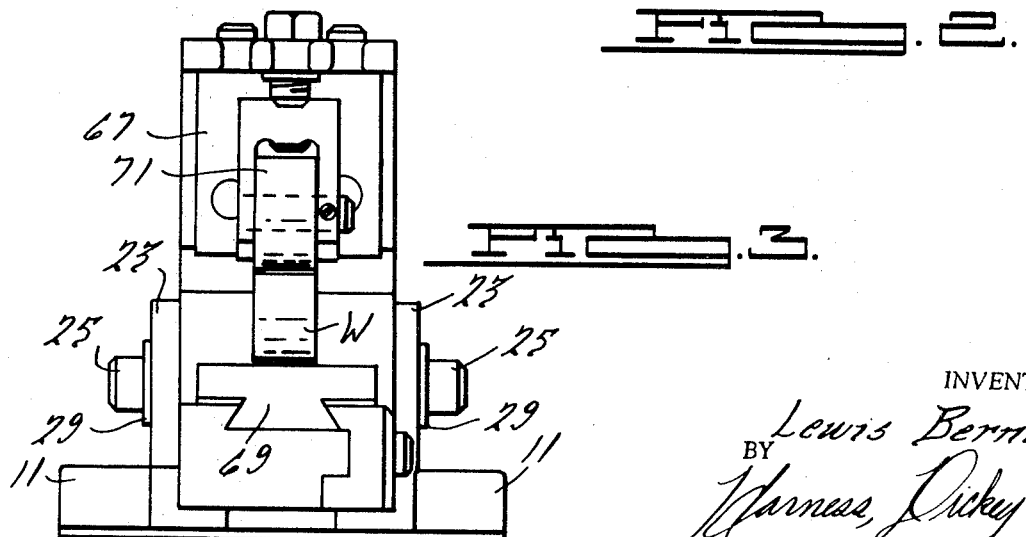

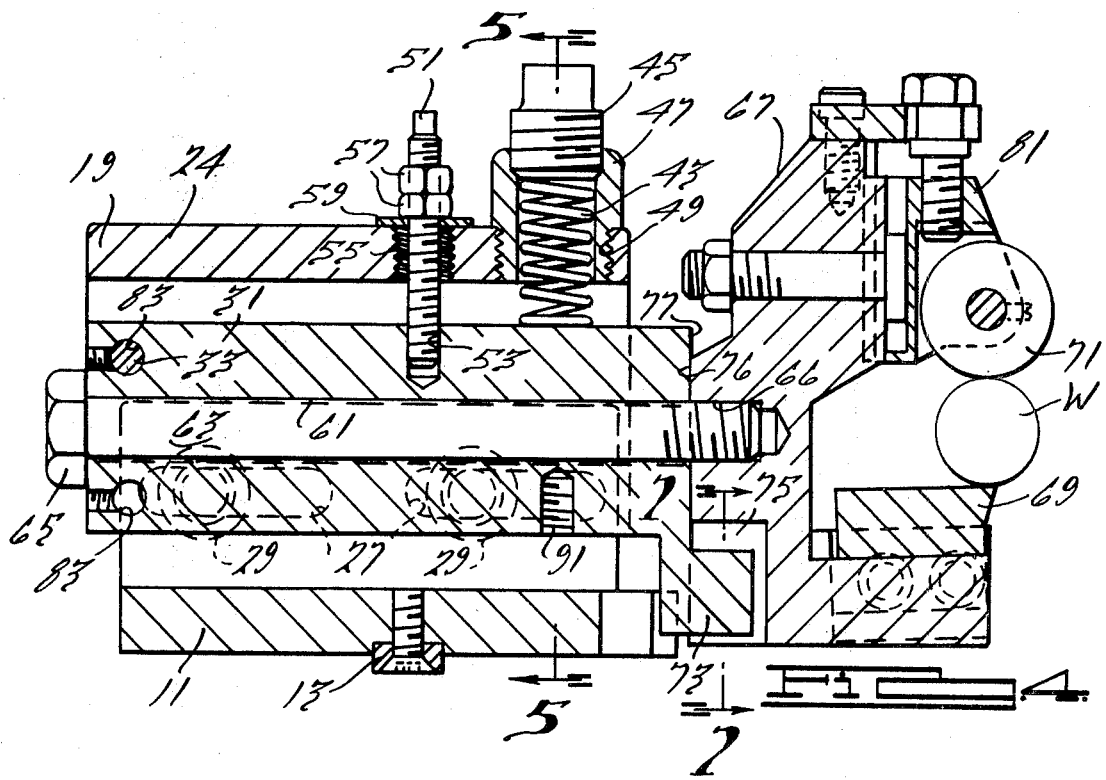
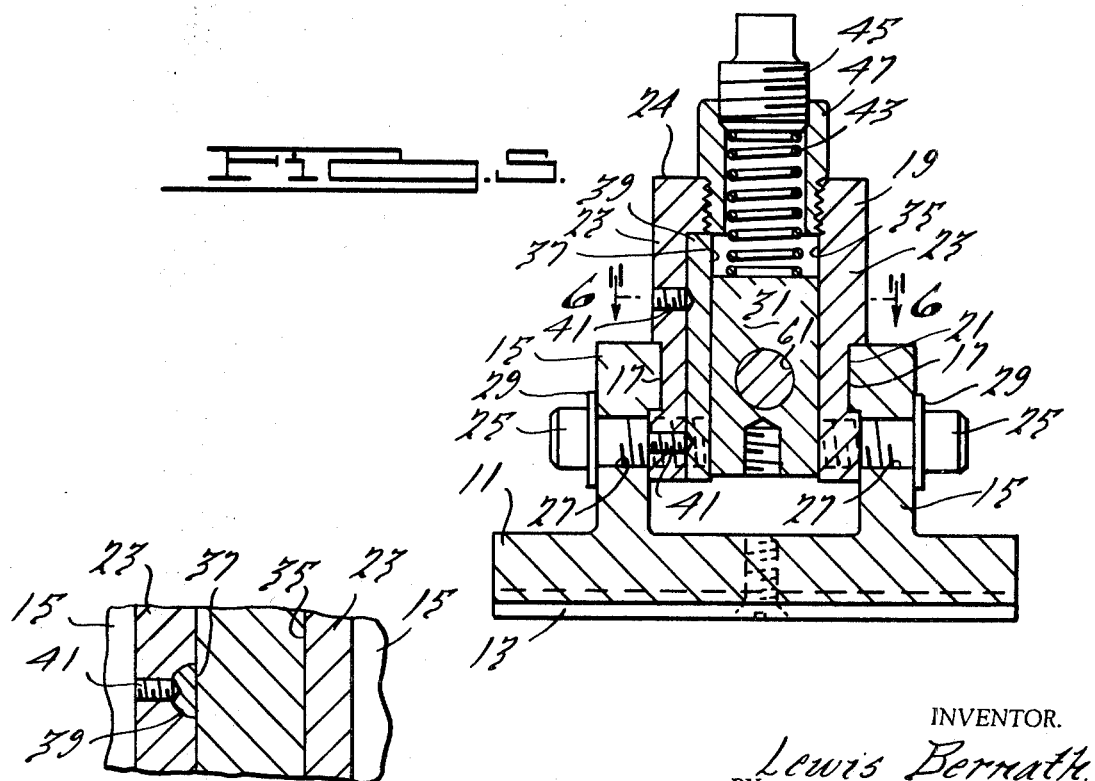

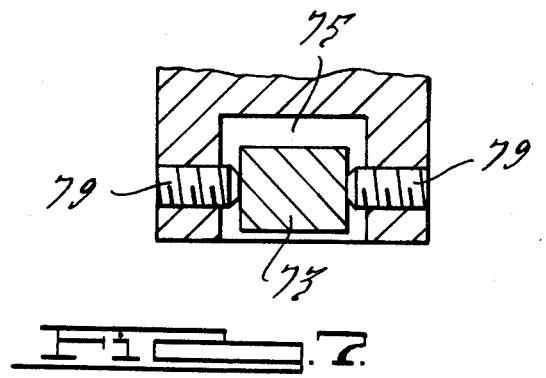
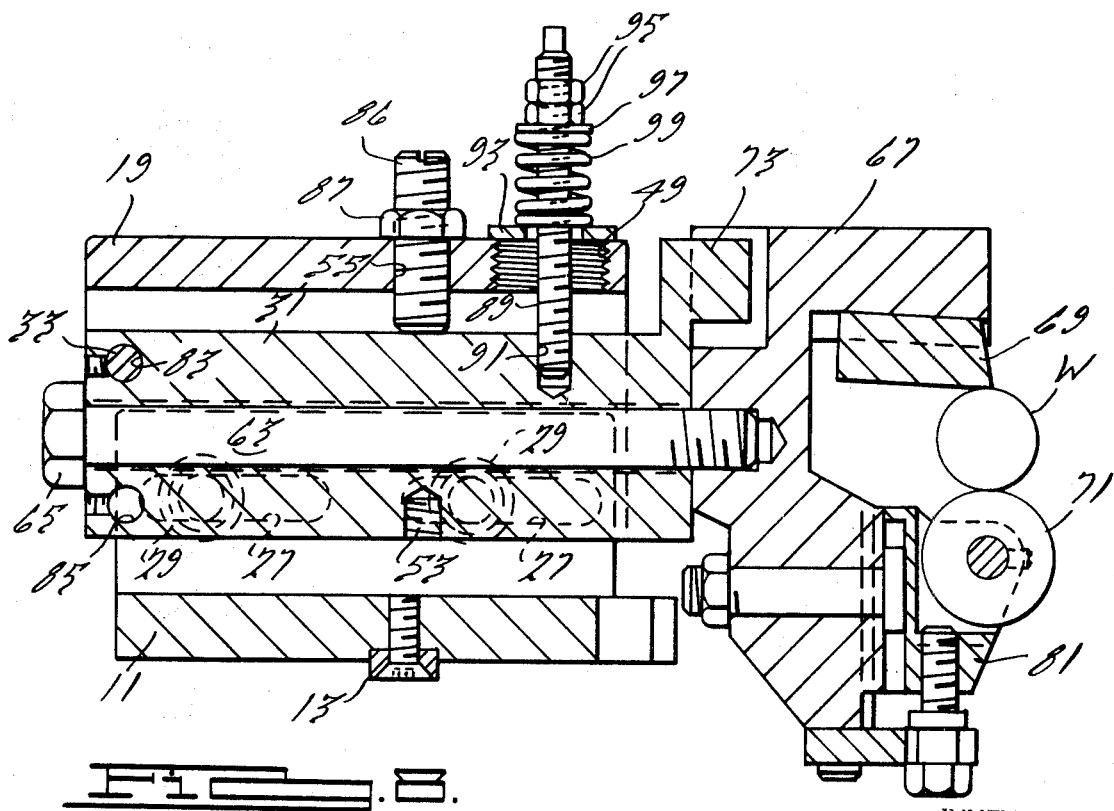

TOOL HOLDER

SUMMARY OF THE INVENTION

The tool holder of the present invention is characterized by the use of a pivoting arm which carries a head at one end thereof. The arm is pivotable within a guiding slot, one side of which is defined by a gib which may be adjustable to compensate for wear. The tool and a backup roller are carried on a head fastened to one end of the arm. The angular position of the head on the arm is very accurately controlled by set screws which define stops or abutments for the head. The tool holder possesses great flexibility in usage, the arm and head being reversible for utilization at different stations on an automatic screw machine. The support on which the arm is pivoted is clamped in a selected position along a guideway of a base. By this means, the position of the tool laterally of the work can be changed without disturbing the squareness of the tool relative to the work. The tool holder of the present invention possesses a degree of accuracy far surpassing other commercially available tool holders and has been found to be highly dependable. The overall construction is one of extreme ruggedness combined with great precision.

DESCRIPTION OF THE VIEWS OF THE PREFERRED EMBODIMENTS

FIG. 1 is a side-elevational view of a tool holder made in accordance with the present invention.

FIGS. 2 and 3 are plan and end elevational views, respectively, of the structure illustrated in FIG. 1;

FIG. 4 is a sectional view of the structure illustrated in FIG. 2, taken on the line 4-4 thereof;

FIG. 5 is a sectional view of the structure illustrated in FIG. 4, taken on the line 5-5 thereof;

FIG. 6 is a sectional view of the structure illustrated in FIG. 5, taken along the line 6-6 thereof;

FIG. 7 is a sectional view of the structure illustrated in FIG. 4, taken along the line 7-7 thereof; and FIG. 8 is a view of the structure similarly illustrated in FIG. 4, showing a modified form of the invention.

Referring now to the drawings, the tool holder includes a base 11 which is designed to be rigidly secured in a selected position on a slide (not shown) of an automatic screw machine, or the like. An abutment strip 13 is utilized in positioning the base 11 on such slide. The base 11 has a pair of spaced parallel upstanding sidewalls 15. The walls 15 have keys or guideways 17 formed at the upper ends thereof. A support member 19 is positioned between the walls 15 and projects upwardly therefrom. The support member 19 has a cross-sectional shape similar to an inverted U and is provided with longitudinally extending keyways 21 in which the keys 17 are conformably fitted to support the member 19 for sliding movement. The keyways 21 are formed in the outer sides of spaced parallel sidewalls 23 connected by an upper wall 24. A pair of screws 25 are threaded into each of the walls 23 and project through elongated slots 27 formed in the walls 15 of the base 11. The screws 25 carry washers 29 and upon the tightening of the screws the sidewalls 15 are clamped between the washers 29 and the walls 23 of the support member 19. By this means the support member 19 may be locked in various selected positions longitudinally of the base 11.

A lever arm 31 is supported for pivotal movement between the walls 23 on a pivot pin 33. The pivot pin 33 is supported between the walls 23 at the rear end thereof. The arm 31 extends longitudinally between the walls 23 and projects from the support member 19 at the forward end thereof. The vertical pivoting movement of the forward end of the arm 31 is guided between a wall 35 formed on the inside of one of the walls 23 and a wall 37 formed on one side of an adjustable gib 39. The spacing between the walls 35 and 37 is controlled by screws 41 threaded through one of the walls 23 and bearing against the gib 39. Accordingly, lateral wobble or displacement of the forward end of the arm 31 is restrained. It should be noted, however, that the walls 35 and 37 do not clamp the arm 31, but permit it to move vertically therebetween.

The arm 31 is biased downwardly by a coil spring 43 which is seated against a plug 45. The plug 45 is threaded into a generally sleeve-shaped guide member 47 which is, in turn, threaded into an opening 49 of the wall 24. By rotating the plug 45, it may be moved up and down within the guide member 47 and the position of the seat for the spring 43 varied. By this means the force which the spring 43 applies to the arm 31 can be regulated. The position to which the arm 31 is biased by the spring 43 is determined by means including a stud 51 threaded into an opening 53 in the arm 31 at a location between the spring 43 and the pivot pin 33. The stud 51 passes freely through a larger diameter opening 55 formed in the wall 24 and receives a pair of nuts 57 which bear against a washer 59. The washer 59 abuts the upper surface of the wall 24 to limit downward movement of the forward end of the arm 31 under the force of the spring 43. Accordingly, the stud 51 and the structure it carries, the arm 31, and the wall 24 may be said to provide interengaging "stop" or "abutment" means.

The arm 31 is provided with an opening 61 extending longitudinally through the entire length thereof. A bolt 63 extends through said opening with its head 65 bearing against the rear end of the arm 31. The forward end of the bolt 63 is threaded into a tapped hole 66 formed in a head 67. The head 67 serves to support a shaving tool 69 and a backup roller 71. The arm 31 has a forwardly projecting shoulder portion 73 which is positioned within a larger sized recess 75 in the rear side of the head 67. The bolt 63 holds a flat surface 76 on the rear of the head against a flat surface 77 formed on the forward end of the arm 31. In order to prevent the head from pivoting about the bolt axis a pair of set screws 79 are threaded through the head 67 so as to project into the recess 75 and engage the shoulder portion 73 on opposite sides thereof. By advancing one of the set screws 79 and retracting the other of said set screws, the angular position of the head 67 about the axis of the bolt 63 can be very accurately controlled and the head can be prevented from turning.

The backup roller 71 is rotatably supported on a bracket 81 which is secured on the head 67 for adjustment toward and away from the tool 69. The backup roller 71 is adapted to engage a workpiece W on the diametrically opposite side thereof from the tool 69. Likewise, the tool 69 may be adjustably clamped in a selected position on the head 67. The particular manner in which the backup roller 71 and the tool 69 are positioned on the head 67 forms no part of the present invention. The usage of the tool is such that the entire tool holder is advanced in a direction parallel to the axis of the bolt 63, said direction being herein referred to as one which is "longitudinal" of the tool holder. This is accomplished by the movement of a slide (not shown) of the automatic screw machine, or the like, on which the toolholder is mounted. The workpiece W is, of course, driven in rotation. Should there be some misalignment between the tool 69 and the workpiece W, any such misalignment is overcome by setting up the tool holder in such a manner that the backup roller 71 will first contact the workpiece W, assuring that the tool 69 will take a bite into the work of the desired depth. If desired, the force applied by the spring 43 may be made so strong that little or no deflection of the arm 31 against the spring will occur.

One of the particularly desirable features of the tool holder is the ability to reverse of invert the head 67 and arm 31. This is done relatively simply by knocking out the pivot pin 33, removing the arm 31 and head 67 from the support 19, rotating this assembly 180° and reinserting the pivot pin 33 in another hole 83 of the arm 31. This produces the arrangement of parts illustrated in FIG. 8. In this arrangement of parts, a hole 85 in which the pivot pin 33 was previously positioned is empty. For the arrangement shown in FIG. 8 the stud 51, together with its associated structure, is removed and set aside, as are the coil spring 43, guide member 47, and plug 45. In their place an abutment stud 86 is threaded into the opening 55 and is secured in place by a locknut 87. Similarly, a threaded stud 89 is threaded into a tapped hole 91 of the arm 31 and passes upwardly freely through a washer 93, which is seated on the support member 19 over the upper end of the opening 49. The stud 89 carries a pair of nuts 95 and a washer 97 at its upper end which bear against the upper end of a coil spring 99. By this arrangement an upward biasing force is applied to the arm 31, causing the arm to engage a stop defined by the lower end of the stud 86. The arrangement of parts illustrated in FIG. 8 is necessary for the installation of the tool holder at certain stations of most automatic tool machines. Whether the arrangement illustrated in FIG. 4 or FIG. 8 is necessary will depend upon the direction of rotation to the workpiece W with respect to the side of the workpiece from which the tool holder is advanced toward the workpiece. Tool holders used on one side of the workpiece W will require one position of the parts and tool holders used on the other side will require another position of the parts.

I claim:

1. A tool holder for machining a rotationally driven workpiece including a base having a pair of upstanding laterally spaced parallel sidewalls, a support member having a pair of laterally spaced parallel sidewalls and an upper wall connecting said support member sidewalls at the upper ends thereof, an arm pivotally mounted between said support member sidewalls, a cutter head carried at one end of said arm, said support member sidewalls being disposed in side-by-side relation with said base sidewalls and being guided by said base sidewalls for movement parallel thereto, clamping means connecting said base and support member sidewalls for locking said support member in selected positions on said base and means pivotally biasing said arm.

2. The structure set forth in claim 1 in which said clamping means includes screws threaded into said supporting member, said base having longitudinally elongated slots in the sidewalls thereof which receive said screws.

3. The structure set forth in claim 1 including a gib disposed between said arm and one of said support member sidewalls and means for adjusting said gib against said arm.

4. The structure set forth in claim 2 including screw means for holding said head on said arm and interengaging shoulder and adjustable abutment means between said arm and said head spaced laterally from said screw, said abutment means being adjustable to vary the angular position of said head about the threaded axis of said screw.

5. The structure set forth in claim 1 in which said biasing means comprises a spring carried by said upper wall.

6. The structure set forth in claim 1 including means defining a stop for limiting pivotal movement of said arm in one direction, said means being associated with said upper wall.

7. The structure set forth in claim 1 including a pair of pivot pin openings extending through said arm and a pivot pin selectively engageable in one of said openings and supported at its opposite ends by said support member walls, said openings being disposed equidistant above and below a horizontal plane intersecting the axis of rotation of the workpiece.

8. The structure set forth in claim 1 including interfitting key and keyway means on said base and support member sidewalls.